Feb. 23, 1926.

H. S. COE 1,574,557

FILTERING APPARATUS

Filed Jan. 26, 1920        2 Sheets-Sheet 1

INVENTOR.
H. S. COE.

BY
[signature]
ATTORNEY.

Feb. 23, 1926.

H. S. COE 1,574,557

FILTERING APPARATUS

Filed Jan. 26, 1920

2 Sheets-Sheet 2

INVENTOR.
H. S. COE.

BY
ATTORNEY

Patented Feb. 23, 1926.

1,574,557

UNITED STATES PATENT OFFICE.

HARRISON S. COE, OF MOUND CITY, KANSAS, ASSIGNOR, BY MESNE ASSIGNMENTS, TO THE CYCLE COMPANY, OF COLORADO SPRINGS, COLORADO, A CORPORATION OF COLORADO.

FILTERING APPARATUS.

Application filed January 26, 1920. Serial No. 354,177.

*To all whom it may concern:*

Be it known that I, HARRISON S. COE, a citizen of the United States, residing at Mound City, in the county of Linn and State of Kansas, have invented certain new and useful Improvements in Filtering Apparatus, of which the following is a specification.

This invention relates to filtering apparatus of the class in which the filtration of mixtures of solids and liquids such as the dirty waters obtained in the performance of metallurgical and chemical processes, is accomplished through the medium of a granular filter bed through which the liquid percolates, and means which automatically remove the fouled upper strata of the filter bed together with the solid residue of the material under treatment which settles on the surface of the same.

An illustrative embodiment of a filter of this character has been shown and described in my application for patent, Serial Number 317,237, filed August 13, 1920, and it is the primary object of the present invention to provide in a filtering apparatus of the type above referred to certain modifications and improvements in the construction and arrangement which serve to increase its efficiency and facilitate its operation.

Figure 1:
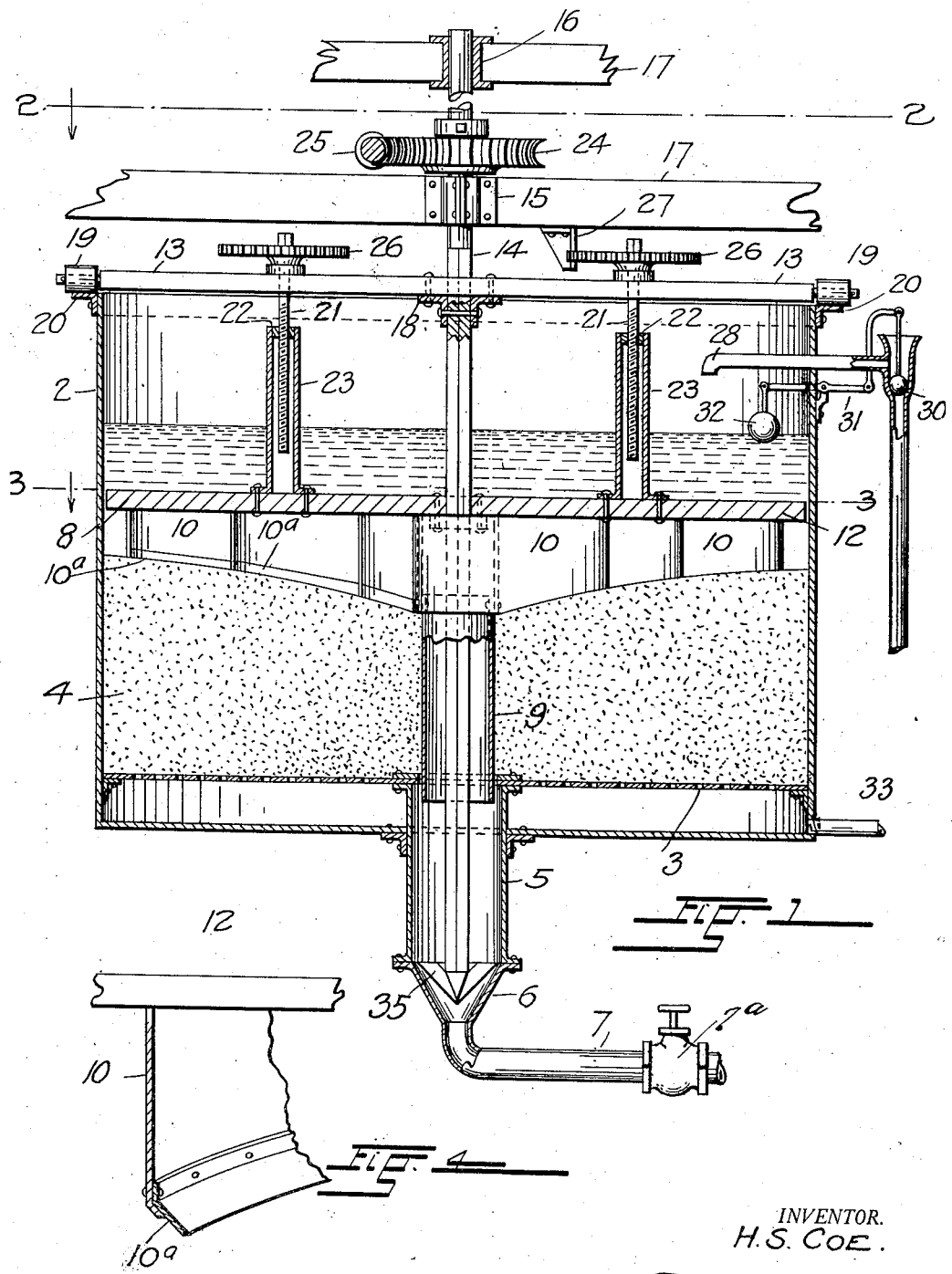
Figure 2:
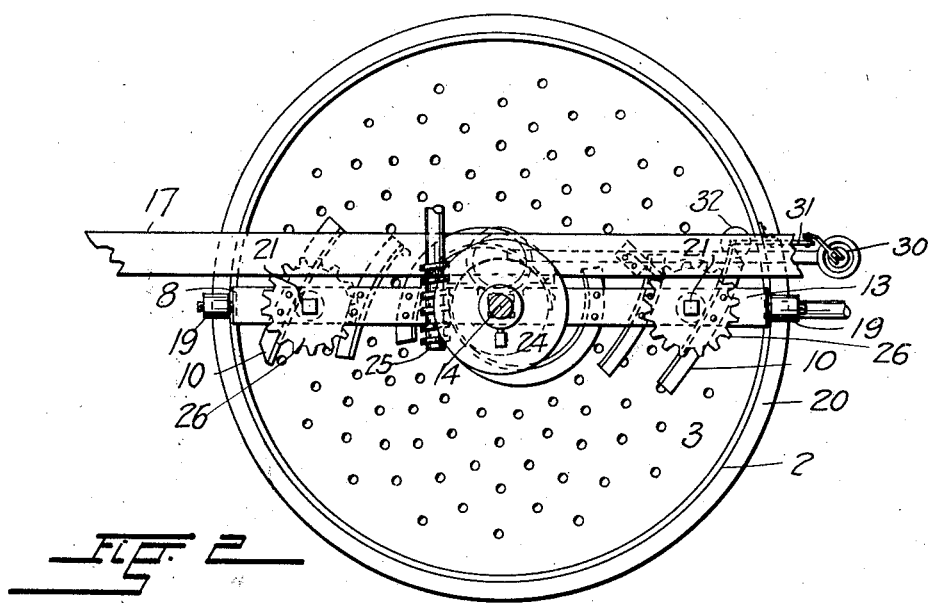
Figure 3:
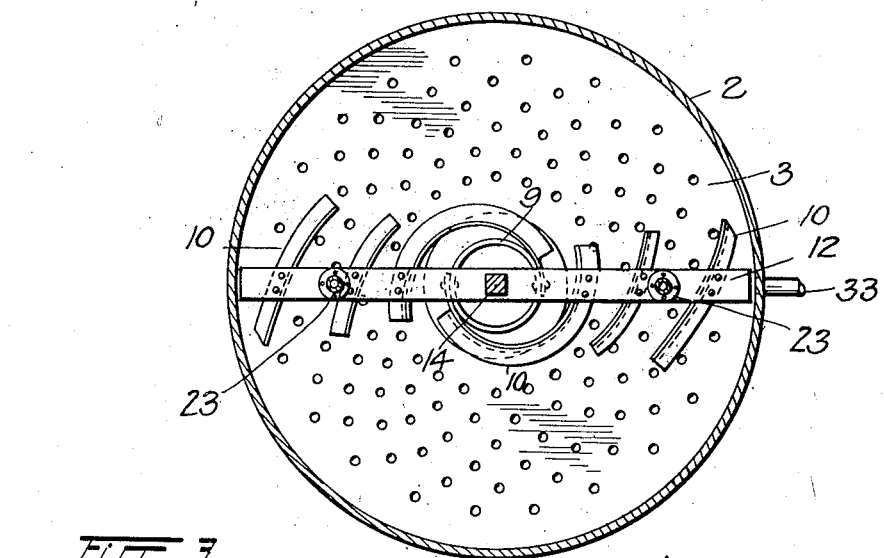

In the accompanying two sheets of drawings in the several views of which like parts are similarly designated, Figure 1 is a vertical section through a filtering apparatus of the type referred to, in which the improved features of construction are embodied;

Figure 2, a section on the line 2—2, Figure 1 drawn to a reduced scale;

Figure 3, a similarly reduced section taken on the line 3—3, Figure 1, and

Figure 4 a fragmentary perspective view of one of the scraper blades of the apparatus showing the removable cutting strips at the lower ends thereof.

Referring to the drawings, the reference character 2 designates a preferably cylindrical tank which in spaced relation to its bottom surface, has a perforated partition 3 for the support of the filter bed.

The filter bed, which in the drawings has been designated by the numeral 4, is composed of a granular substance, preferably sand or charcoal, which is sufficiently permeable to permit of the percolation of the liquid in a mixture of liquid and solids fed onto the upper surface of the same.

A residue-discharge conduit 5 extends through central openings in the partition 3 and the bottom of the tank, to which it is connected by water-tight joints, and it connects at its lower end with the funnel-shaped mouth 6 of a pipe 7 of reduced diameter a valve 7ª on the pipe 7 is provided to restrict the outflow of material in liquid from the tank and regulate it according to different conditions.

The residue of the material remaining on the surface of the filter bed, is removed into the discharge-conduit together with the fouled upper strata of the bed, by the operation of a scraping element 8 and a therewith connected well 9 which telescopes into the conduit 5 and extends to the surface of the filtering substance.

The scraping element consists of a series of curved blades 10 assembled on a bar 12 which is suspended from a cross-bar 13 on an upright shaft 14 which extends centrally into the tank, and is supported for rotation in bearings 15 and 16 on a superstructure 17 of suitable design.

The cross-bar 13 from which the scraper assemblage is suspended is rigidly connected with the shaft through the medium of a flanged collar 18, and rollers 19 mounted at its extremities serve for its movable support upon a circular track 20 provided by a rim of angular section at the periphery of the tank.

The portion of the shaft within the tank is angular in section and passes freely through a correspondingly formed opening in the bar of the scraper element to impart thereto a rotary motion while permitting of its independent downward movement.

The scraper blades which extend to the surface of the filter bed are placed at different distances from the center of the tank and their length decreases toward the periphery of the same so that their scraping action upon the surface of the granular filtering substance produces a sink which greatly facilitates and expedites the movement of the loosened matter, to the central well 9 which is rigidly attached to the scrapers of the series nearest the center of the tank.

The scraper blades have at their lower ends forwardly extending cutting strips 10a which are removably fastened to the blades as shown in Figure 4 so that they may be readily replaced in case of wear or breakage.

The shaft 14 has at its lower end within the funnel-shaped mouth of the discharge-pipe 7, a stirring blade 35 which keeps the residue from packing and thereby insures a continuously outward movement of the same.

The scraping element is movably suspended from the cross-bar on the shaft through the medium of two feed-screws 21 which are mounted for rotation in bearings on said bar and fitted in nuts 22 on the bar 12 to which the scrapers are attached.

The nuts are preferably placed at the upper ends of tubular hangers 23 which are rigidly secured to the bar of the scraping device and which in practise serve as protective casings for the lower portions of the screws.

A worm-wheel 24 mounted on the shaft between its bearings, meshes with a worm 25 on a driving shaft to impart a slow rotary movement to the scraping device over the upper surface of the filter bed.

The feed screws on the transverse bar of the shaft are during said movement intermittently rotated for the purpose of lowering the scraper element in the tank and they are to this end provided with toothed wheels 26 which cooperate with one or more detents 27 relatively fixed on the structure of the apparatus on which the shaft is mounted.

The material to be filtered is fed into the tank by a conduit 28 the flow being automatically regulated by a valve 30 which through the medium of a lever 31 is connected with a float 32 on the surface of the liquid in the tank.

Having thus described the mechanical construction of my improved filtering apparatus, its operation, briefly stated, is as follows:

The mixture of liquids and solids fed into the tank through the feed conduit is distributed over the surface of the granular filter bed which retains the solid constituents of the material while the liquid percolates into the space beneath the perforated partition 3, from which it is discharged through a pipe 33.

I desire it understood that the operation may be expedited by connecting the space in the bottom portion of the tank with a suitable suction device to induce a partial vacuum beneath the filter bed.

While the liquid in the material percolates through the permeable substance the upper portion thereof together with the settled residue are skimmed into the central well by the rotating scraping element which is lowered at regular intervals through the automatic action of the feeding mechanism to maintain its operative position with relation to the gradually subsiding surface of the filter bed.

After the filtering material has been exhausted the scraping element is raised by reverse rotation of the feed screws which to this end are squared at their upper ends for the application of a correspondingly socketed crank, and the tank is refilled with the granular substance to its original depth.

The float valve controlling the flow through the feed conduit regulates the inflow of fresh material according to the rate at which the liquid percolates through the filter bed and the rotating stirring blade at the end of the shaft keeps the solid matter from clogging the conduits through which it passes to the point of discharge.

The method of supporting the scraping element at the periphery of the tank prevents vertical vibration and lateral displacement so that a film of even thickness is skimmed off the filter bed together with the residuent solids which settled thereon.

Having thus described my invention what I claim is:

1. In filtering apparatus of the character described, the combination of a tank, a filter-bed therein, having a passage extending downwardly from its surface, and mechanism for moving the upper strata of the filter bed to said passage; comprising a rotary shaft mounted against longitudinal displacement, a scraping device connected for rotation with the shaft, and free therefrom for independent downward motion, and means to effect an intermittent downward movement of the device during rotation of the shaft.

2. In filtering apparatus of the character described, the combination of a tank, a filter-bed therein, having a passage extending downwardly from its surface, and mechanism for moving the upper strata of the filter bed to said passage, comprising a rotary shaft mounted against longitudinal displacement, a scraping device connected for rotation with the shaft, and free therefrom for independent downward motion, a feed screw carried by the shaft, a nut on the scraping device cooperating therewith, and means for the rotation of the feed screw by the rotary movement of the shaft.

3. In filtering apparatus of the character described, the combination of a tank, a filter-bed therein, having a passage extending downwardly from its surface, and mechanism for moving the upper strata of the filter bed to said passage, comprising a rotary shaft mounted against longitudinal displacement, a scraping device connected for rotation with the shaft, and free therefrom for independent downward motion, a feed-screw carried by the shaft, a nut on the scraping device cooperating therewith, and means for the intermittent rotation of the feed-screw by the rotary movement of the shaft.

4. In filtering apparatus of the character described, the combination of a tank, a filter-bed therein, having a passage extending downwardly from its surface, and mechanism for moving the upper strata of the filter bed to said passage, comprising a rotary shaft mounted against longitudinal displacement, a scraping device connected for rotation with the shaft, and free therefrom for independent downward motion, a feed-screw carried by the shaft, a nut on the scraping device, cooperating therewith, a toothed wheel on the feed screw, and a relatively fixed detent adapted to engage said wheel during rotation of the shaft.

5. In filtering apparatus of the character described, the combination of a tank, a filter-bed therein, having a passage extending downwardly from its surface, and mechanism for moving the upper strata of the filter bed to said passage, comprising a rotary shaft mounted against longitudinal displacement, a scraping device conected for rotation with the shaft and free therefrom for independent downward motion, a cross-bar on the shaft, feed screws on the cross bar, nuts on the scraping device cooperating with said screws, and means for the rotation of the screws by the rotary movement of the shaft.

6. In filtering apparatus of the character described, the combination of a tank, a filter-bed therein, having a passage extending downwardly from its surface, and mechanism for moving the upper strata of the filter bed to said passage, comprising a rotary shaft mounted against longitudinal displacement, a scraping device connected for rotation with the shaft, and free therefrom for independent downward motion, feed-screws carried by the shaft, tubular hangers on the scraping device having nuts cooperating with the screws, and means for the rotation of the screws by the rotary movement of the shaft.

7. In filtering apparatus of the character described, the combination of a tank, a permeable filtering substance therein, a rotary shaft mounted against longitudinal displacement, a scraping device adapted to remove the upper strata of the filtering substance, said device being connected for rotation with the shaft and free therefrom for independent downward motion, and a well, extending through the filtering substance, in connection with the scraping device.

8. In filtering apparatus of the character described, the combination of a tank, a permeable filtering substance therein, a discharge conduit extending from the bottom of the tank, a downwardly movable well extending through the filtering substance into said conduit, and a scraping device connected to move with the well and adapted to remove the upper strata of the filtering substance to the mouth thereof.

9. In filtering apparatus of the character described, the combination of a tank, a perforated partition therein, a permeable filtering substance on said partition, a discharge conduit extending from the partition, through the bottom of the tank, a downwardly movable well extending through the filtering substance, into said conduit, and a scraping device connected to move with the well and adapted to remove the upper strata of the filtering substance to the mouth thereof.

10. In filtering apparatus of the character described, the combination of a tank, a permeable filtering substance therein, a discharge conduit at the bottom of the tank, a downwardly movable well extending through the filtering substance into the conduit, a scraper movable with the well, a rotary shaft operatively connected with the well and the scraper, and a stirring blade on the shaft within the conduit.

11. A filter comprising a tank, a filter bed therein having a passage opening in its upper surface, a circular track, a frame supported on the track to move about a vertical axis central of said passage, a scraping element downwardly intermittently movably suspended from the frame and engaging the surface of the bed to move the upper stratum thereof to the mouth of the passage by its rotation with the frame, and means actuated by the rotation of the scraper element for producing said downward movement thereof.

12. A filter comprising a tank, a filter bed therein having a central passage opening in the upper surface thereof, a rotary shaft co-axial with said passage, a frame connected to the shaft and supported for rotation with the same, a scraping-element downwardly intermittently movably suspended from the frame and engaging the surface of the bed to move the upper stratum thereof to the mouth of the passage by its movement with the frame, and means actuated by the rotation of the scraper element for producing said downward movement thereof.

13. A filter comprising a tank, a filter bed therein having a central passage opening in the upper surface thereof, a rotary shaft co-axial with said passage, a frame connected to the shaft and supported for rotation with the same, and a scraping-element downwardly intermittently movably suspended from the frame and guided by the shaft, said element engaging the surface of the bed to move the upper stratum thereof to the mouth of the passage by its movement with the frame, and means actuated by the rotation of the scraper element for producing said downward movement thereof.

14. A filter comprising a tank, a filter bed therein having a passage opening in its upper surface, a rotary shaft co-axial with said passage and immovably in the direction of its length, a downwardly movable scraper-element mounted to rotate with the shaft and engaging with the surface of the bed to move the upper stratum thereof to the mouth of the passage, and means to effect an intermittently downward movement of the scraper-element during and by its rotary motion with the shaft.

15. In a filtering apparatus, the combination of a tank, a filter-bed therein having a passage extending downwardly from the surface, means including a shaft for moving the upper strata of the filter-bed to said passage, and automatic means for intermittently lowering the former means as the surface of the filter-bed subsides, said automatic means being intermittently operated by the continuous rotation of the shaft.

16. In a filtering apparatus, the combination of a tank, a filter-bed therein having a passage extending downwardly from the surface, scraper-means comprising a series of scraper blades, at different distances from the center of the tank and of decreasing height towards the periphery of the tank, and automatic intermittent means for lowering the scraper-means as the surface of the filter-bed subsides.

In testimony whereof I have affixed my signature.

HARRISON S. COE.